US010976238B2

(12) United States Patent
Shan et al.

(10) Patent No.: US 10,976,238 B2
(45) Date of Patent: Apr. 13, 2021

(54) MEASUREMENT APPARATUS FOR MICRO- AND NANO-SCALE MATERIAL AND MEASUREMENT METHOD THEREOF

(71) Applicant: Xi'an Jiaotong University, Xi'an (CN)

(72) Inventors: Zhiwei Shan, Xi'an (CN); Huanhuan Lu, Xi'an (CN); Ju Li, Cambridge, MA (US)

(73) Assignee: Xi'an Jiaotong University, Xi'an (CN)

( * ) Notice: Subject to any disclaimer, the term of this patent is extended or adjusted under 35 U.S.C. 154(b) by 147 days.

(21) Appl. No.: 16/262,603

(22) Filed: Jan. 30, 2019

(65) Prior Publication Data

US 2020/0240901 A1 Jul. 30, 2020

(51) Int. Cl.
*G01N 19/02* (2006.01)
*G01N 3/06* (2006.01)

(52) U.S. Cl.
CPC .............. *G01N 19/02* (2013.01); *G01N 3/066* (2013.01); *G01N 2203/005* (2013.01); *G01N 2203/0635* (2013.01)

(58) Field of Classification Search
CPC ................................ G01N 19/02; G01N 3/066
See application file for complete search history.

(56) References Cited

U.S. PATENT DOCUMENTS

| 6,100,687 A * | 8/2000 | Weitekamp | ........ | G01R 33/4625 |
| | | | | 324/300 |
| 6,683,451 B1 * | 1/2004 | Moore | ................... | B82Y 35/00 |
| | | | | 324/218 |
| 6,862,923 B2 * | 3/2005 | Buguin | ................... | B82Y 35/00 |
| | | | | 250/306 |
| 8,569,714 B2 * | 10/2013 | Han | ........................ | G01N 23/04 |
| | | | | 250/440.11 |
| 2002/0092359 A1 * | 7/2002 | Lange | ................... | G01Q 20/04 |
| | | | | 73/779 |

(Continued)

FOREIGN PATENT DOCUMENTS

JP 2006-38500 * 2/2006

OTHER PUBLICATIONS

"The Piezotronic Effect of Zinc Oxide Nanowires Studied by In Situ TEM", Yang et al., Advanced Materials, 2012, pp. 4676-4682.*
English Translation of JP 2006-38500.*

*Primary Examiner* — Helen C Kwok
(74) *Attorney, Agent, or Firm* — Dragon Sun Law Firm, PC; Jinggao Li, Esq.

(57) ABSTRACT

A measurement apparatus for micro- and nano-scale materials and a measurement method thereof are provided. The measurement apparatus for the micro- and nano-scale material includes a transmission electron microscope to generate a magnetic field, and a conductive flat punch and a sample which are arranged in the magnetic field. The sample includes the micro- and nano-scale materials. When the current passes through the sample and the conductive flat punch, the conductive flat punch deflects laterally relative to the sample with controllable displacement driven by the electromagnetic force. The required lateral displacement of the present invention is controllable, so that the utilization rate of equipment is greatly increased, and the cost is reduced. In addition, the whole test is performed in the transmission electron microscope, so that a measurement process can be observed in real time.

10 Claims, 9 Drawing Sheets

(56) References Cited

U.S. PATENT DOCUMENTS

| | | | |
|---|---|---|---|
| 2005/0164299 A1* | 7/2005 | Stewart | G01N 33/54373 435/7.1 |
| 2005/0241375 A1* | 11/2005 | Naughton | B82Y 35/00 73/105 |
| 2005/0247998 A1* | 11/2005 | Kawakatsu | G01Q 60/38 257/531 |
| 2006/0223171 A1* | 10/2006 | Craighead | G01N 33/54373 435/287.2 |
| 2008/0284422 A1* | 11/2008 | Ishio | B82Y 15/00 324/226 |
| 2010/0301854 A1* | 12/2010 | Rugar | B82Y 35/00 324/307 |
| 2015/0355040 A1* | 12/2015 | Sirbuly | G01L 1/242 356/73.1 |
| 2019/0025257 A1* | 1/2019 | Martinez-Martin | G01N 29/036 |

* cited by examiner

MEASUREMENT APPARATUS FOR MICRO- AND NANO-SCALE MATERIAL AND MEASUREMENT METHOD THEREOF

TECHNICAL FIELD

The present invention relates to the technical field of in situ mechanics under transmission electron microscopes, and particularly relates to a measurement apparatus for a micro- and nano-scale material and a measurement method thereof.

BACKGROUND

Due to a strong demand of social development for miniaturization of functional devices, researches on the structure and the performance of a micro- and nano-scale material have become an emerging and thriving research direction (Nix, W. D., Thin Solid Films (2007)). However, the performance of the micro- and nano-scale material may not be obtained through extrapolation based on a knowledge system of a macroscopic bulk material, so that it is in urgent need of a new mechanical test tool and method to meet test requirements of the micro- and nano-scale material (Shan Zhiwei, MATERIALS CHINA (2013)). To systematically and accurately investigate the mechanical characteristics and the underlying mechanism of the micro- and nano-scale material, a monitoring platform having a tens of thousands to hundreds of thousands of magnification factor is needed at first, and then, an in situ test technology having the space resolution at nano-meter and the mechanical test accuracy at nano-Newton is also needed.

An electron microscope is a microscope using electron beam for illumination, and has millions of magnification factor, which provides a basic observation platform for the research on the micro- and nano-scale material. The in-situ transmission electron microscope (in situ TEM) technology implements real-time observation of a dynamic process of the change in shape and structure of a sample under external stimulations such as force, heat and electricity by modifying a transmission electron microscope and a sample holder.

Modifying the sample holder is a main way to implement a mechanical test on the micro- and nano-scale material. In commercial sample holders, the Hysitron Incorporated Company in America developed the PI95-series holder based on the actuatable capacitive transducer. The position of a flat punch could be accurately adjusted through three-level control systems, i.e. mechanical control for millimeter-scale adjustment, piezoelectric ceramic for micrometer-scale adjustment and capacitive transducer nanometer-scale adjustment, and a quantitative force and displacement relation is output. However, the sample holder of the PI95 series may only apply a uniaxial force because of space limitation in the transmission electron microscope, so that application of the sample holder in researches on friction requiring a two-dimensional force is greatly restricted. In addition, on the influence of feedback control system, there is a certain lag effect in time on displacement and force application. Thus, a load frequency would be restricted to a certain extent during application of a cyclic load.

In addition, the sample holder of the Nano factory Company is based on the inertial sliding design. The flat punch is connected to a sapphire ball through metal springs. When piezoelectric ceramic controls the sapphire ball to move, the metal springs may inertially side along the surface of the sapphire ball so as to enable the flat punch to move along a three-dimensional direction. However, the inertia-dependent sliding is unable to provide an accurate control for the quantitative displacement, and the lateral displacement is also affected by the length of the flat punch and the relative position between the metal springs and the sapphire ball, so that the controllability is poor.

The above-mentioned information disclosed in the background art is only used to strengthen the understanding of the background of the present invention, so that the information possibly includes information not constituting the prior art publically known to those of ordinary skill in the art in China.

SUMMARY

To overcome the shortcomings in the prior techniques, the present invention provides a measurement apparatus for a micro- and nano-scale material and a measurement method so as to solve the problem that an existing electromechanical coupling holder may not be able to apply a lateral displacement or a transverse force provided in a mechanical test on the micro- and nano-scale material is difficult to control.

The objective of the present invention is implemented through the following technical solution.

A measurement apparatus for a micro- and nano-scale material includes:
a transmission electron microscope, used for generating a magnetic field;
a conductive flat punch, arranged on the magnetic field; and
a sample, arranged on the magnetic field, the sample including the micro- and nano-scale material.

When the current passes through the sample and the conductive flat punch, the current direction is perpendicular to the direction of the magnetic field, and the conductive flat punch deflects laterally relative to the sample with controllable displacement driven by the electromagnetic force.

In the measurement apparatus for the micro- and nano-scale material, the conductive flat punch is of a cantilever structure, and the free end of the cantilever structure is in contact with the sample.

In the measurement apparatus for the micro- and nano-scale material, the length of the conductive flat punch in the magnetic field is greater than that of the sample.

In the measurement apparatus for the micro- and nano-scale material, a series circuit of the sample and the conductive flat punch is also connected in series with a current source meter and a current controller.

In the measurement apparatus for the micro- and nano-scale material, the magnitude and/or frequency of the transverse acting force is adjusted through current.

According to another aspect of the present invention, a measurement apparatus for a micro- and nano-scale material includes:
a magnetic field generation unit, used for generating a magnetic field;
a conductive flat punch, arranged on the magnetic field; and
a sample, arranged on the magnetic field, the sample including the micro- and nano-scale material.

When the current passes through the sample and the conductive flat punch, the current direction is perpendicular to the direction of the magnetic field, and the conductive flat punch deflects laterally relative to the sample with controllable displacement driven by the electromagnetic force.

In the measurement apparatus for the micro- and nano-scale material, the magnitude and/or frequency of the transverse acting force is adjusted through the current. According to another aspect of the present invention, a measurement method using the measurement apparatus for the micro- and nano-scale material includes:

first step (S1), installing the conductive flat punch and the sample in the magnetic field, wherein the sample is in contact with the conductive flat punch;

second step (S2), electrically connecting the sample with the conductive flat punch to form an electric circuit; and third step (S3), passing a current to enable the conductive flat punch to move transversely under the action of an ampere force.

In the measurement method, in the first step, the sample processed using a focused ion beam is installed on an electromechanical coupling sample holder, and the electromechanical coupling sample holder is inserted into a transmission electron microscope which generates the magnetic field.

In the measurement method, in the first step, when the sample is insulated, the sample is coated with a conductive layer.

An ampere force-based test apparatus for the in situ mechanical property of the micro- and nano-scale material provided by the present invention includes a transmission electron microscope and an electromechanical coupling sample holder, wherein the electromechanical coupling sample holder is arranged in the transmission electron microscope. In the test, a conductor is connected in series with a conductive flat punch in the electromechanical coupling sample holder to form an electric circuit, and an ampere force is generated once current passes.

Preferably, a series circuit of the conductor and the conductive flat punch is also connected in series with a current source meter and a current controller.

An ampere force-based test method for the in situ mechanical property of a micro- and nano-scale material by using the test apparatus includes:

first step, installing the conductor in the transmission electron microscope through the electromechanical coupling holder, wherein the conductor is in contact with the conductive flat punch in the electromechanical coupling holder;

second step, electrically connecting the conductor with the conductive flat punch to form an electric circuit;

third step, starting the test, and enabling a mechanical controller in the electromechanical coupling holder to apply a constant load to the conductor through the conductive flat punch; and fourth step, passing a linearly increased current to enable the conductive flat punch to generate a gradually increased ampere force, wherein the maximum value of the ampere force is greater than a static friction force between a micro- and nano-scale sample and the conductive flat punch.

By use of the high-intensity magnetic field in the transmission electron microscope, on the basis of the original electromechanical coupling holder, the flat punch may move transversely by only passing the current, which meets a requirement for the in situ mechanical test of the micro- and nano-scale material. Furthermore, in the test, the constant load is applied to the sample through the mechanical controller, so that the only factor affecting the value of the transverse force is the current, and then the transverse force required by the test on the in situ mechanical property of the micro- and nano-scale material is controllable. The apparatus solves the technical problem on the existing in situ mechanical property test on the micro- and nano-scale material, greatly increases the utilization rate of equipment and reduces the experimental cost. In addition, as the whole test is performed in the transmission electron microscope, the test process may be observed in real time.

Preferably, when a friction force of the micro- and nano-scale material is tested, the conductor is a micro- and nano-scale sample.

Preferably, when a friction force of the micro- and nano-scale material is tested, a sine-wave current is adopted.

Preferably, when plastic deformation of the micro- and nano-scale material is tested, the conductor is needle-like with a thin top and a thick base. Meanwhile, the micro- and nano-scale sample is of the cantilever structure, and the side surface of the conductive flat punch is in contact with the micro- and nano-scale sample.

Preferably, when the fatigue performance of the micro- and nano-scale material is tested, the periodically electric pulse is adopted.

Compared with the prior art, the present invention has the beneficial effects that:

by use of the basic knowledge of electromagnetic interaction and based on the high-intensity magnetic field in the transmission electron microscope, the flat punch may move transversely only by passing the current, which meets the test requirement for the in situ mechanical property of the micro- and nano-scale material. The apparatus solves the technical problem on the existing test on the in situ mechanical property of the micro- and nano-scale material, greatly increases the utilization rate of equipment and reduces the experimental cost. In addition, as the whole test is performed in the transmission electron microscope, the test process may be observed in real time. According to the measurement method of the present invention, by use of the high-intensity magnetic field in the transmission electron microscope, on the basis of the original electromechanical coupling holder, the flat punch may move transversely by only passing the current, which meets the test requirement for the in situ mechanical property of the micro- and nano-scale material. Furthermore, in the test, the constant load is applied to the sample through the mechanical controller, so that the only factor affecting the magnitude of the transverse force is the current, and then the transverse force required by the test on the in situ mechanical property of the micro- and nano-scale material is controllable.

The above-mentioned descriptions are only summaries of the technical solutions of the present invention. To make the technical measures of the present invention clearer so that those skilled in the art can implement the test according to contents in the description, and to make the above-mentioned and other objectives, features and advantages of the present invention clearer and more understandable, specific implementation modes of the present invention are exemplified below.

BRIEF DESCRIPTION OF THE DRAWINGS

Various other advantages and benefits of the present invention will become clearer for those of ordinary skill in the art by reading detailed descriptions in the preferred specific implementation modes in the text below. Accompanying drawings of the description are merely used to indicate the objectives of the preferred implementation modes, but are not deemed as limitations to the present invention. Apparently, the accompanying drawings described below are merely some of the embodiments of the present invention, based on which other drawings may be obtained by those of ordinary skill in the art without any creative effort. In addition, in the whole drawings, same referential numerals represent same components.

In the drawings.

The present invention is further explained below in combination with the accompanying drawings and the embodiments.

DETAILED DESCRIPTION

Specific embodiments of the present invention will be described in more detail below with reference to the accompanying drawings. Although the specific embodiments of the present invention are displayed in the accompanying drawings, it should be understood that the present invention can be implemented in various forms and should not be limited by the embodiments described herein. On the contrary, these embodiments are provided to understand the present invention more thoroughly, and the scope of the present invention can be completely passed to those skilled in the art.

It should be noted that some vocabularies are used in the description and claims to refer to specific assemblies. Those skilled in the art should understand that a technician may possibly name the same assembly with different nouns. In the description and claims, assemblies are distinguished on the basis of functional differences instead of noun differences. For example, the "including" or "comprising" mentioned in the whole description and the claims is an open phrase, so that it should be explained as "including but not limited to". Subsequent descriptions in the description are preferred implementation modes of implementing the present invention, so that the descriptions are intended for general principles of the description, but not intended to limit the scope of the present invention. The protection scope of the present invention shall be defined by the attached claims.

To facilitate understanding of the embodiments of the present invention, the specific embodiments will be further explained and described below in combination with the accompanying drawings which do not constitute limitations to the embodiments of the present invention.

Figure 1:
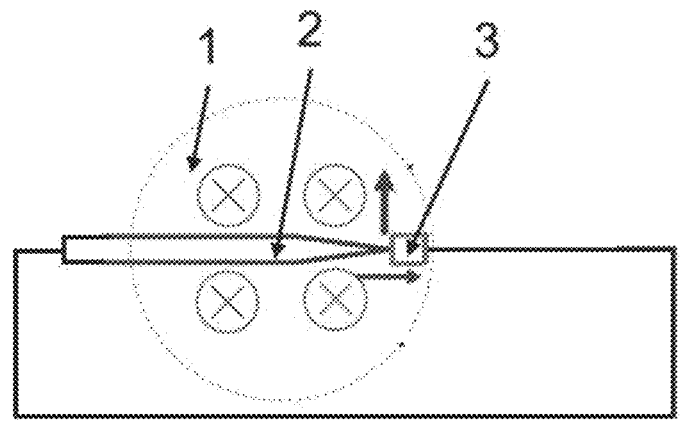
FIG. 1 is a structural schematic diagram of a measurement apparatus for a micro- and nano-scale material according to one embodiment of the present invention.

For better understandings, FIG. 1 is a schematic diagram of a measurement apparatus for a micro- and nano-scale material according to one embodiment of the present invention. As shown in FIG. 1, the measurement apparatus for the micro- and nano-scale material includes:

a transmission electron microscope, used for generating a magnetic field 1;

a conductive flat punch 2, arranged on the magnetic field 1; and a sample 3, arranged on the magnetic field 1, the sample 3 comprising the micro- and nano-scale material.

When the current passes through the sample 3 and the conductive flat punch 2, the current direction is perpendicular to that of the magnetic field, and the conductive flat punch 2 generates a predetermined lateral displacement under the electromagnetic field.

Figure 2:
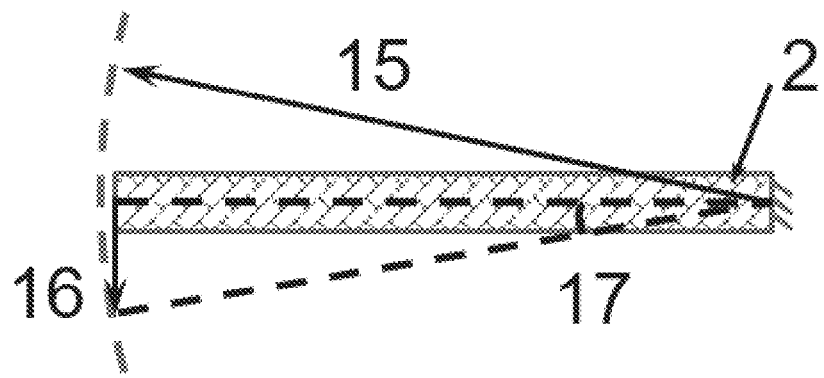
FIG. 2 is a lateral deflection angle of the flat punch schematic diagram of a measurement apparatus for a micro- and nano-scale material according to one embodiment of the present invention.

For further understandings of the present invention, in one embodiment, the conductive flat punch 2 is a driving unit. The effective length of the conductive flat punch 2 in the magnetic field is much greater than the length of the sample 3. It is known that the magnitude of an ampere force is in proportion to the intensity of the magnetic field, the magnitude of the current and the length of an energizing conductor. The conductive flat punch 2 is connected in series with the sample 3, so that the current flowing through is equal. The conductive flat punch 2 and the sample 3 are located in the same magnetic field, so that the intensity of the magnetic field is equal. The effective length of the conductive flat punch 2 in the magnetic field is at millimeter scale, and the length of the sample 3 is at micron-meter scale. Therefore, the ampere force on the conductive flat punch 2 is three orders of magnitude than that on the sample 3, and then when the conductive flat punch 2 is in contact with the sample 3, the ampere force on the sample 3 may be neglected. FIG. 2 is a deflection angle of the flat punch schematic diagram of a measurement apparatus for a micro- and nano-scale material according to one embodiment of the present invention. As shown in FIG. 2, the conductive flat punch deflects transversely mainly under the ampere force. The total length 15 of a cantilever of the conductive flat punch 2 is at a centimeter scale. When the deflection displacement 16 of the conductive flat punch is at the micron-meter scale (this magnitude may be enough for the measurement of the mechanical property of a micro- and nano-scale sample), the maximum deflection angle 17 of the flat punch is $10^{-3}$ deg which may be neglected, so that it can be assumed that the lateral (x direction) displacement and an axial (z direction) displacement are two independent components. Therefore, the present invention, implementing the lateral displacement independent from the axial direction in the transmission electron microscope, may be used to measure the friction performance and the fatigue performance of the micro- and nano-scale material.

In the preferred embodiment of the measurement apparatus for the micro- and nano-scale material, the conductive flat punch is of a cantilever structure, and the free end of the cantilever structure is in contact with the sample.

In the preferred embodiment of the measurement apparatus for the micro- and nano-scale material, the length of the conductive flat punch in the magnetic field is much greater than that of the sample. In one embodiment, the words "much greater than" mean that "at least one magnitude greater than". The length of the conductive flat punch is at the millimeter scale, and the length of the sample is at the micron-meter scale.

A series circuit of the sample and the conductive flat punch is also connected in series with a switch and a current controller 7.

In the measurement apparatus for the micro- and nano-scale material, the magnitude and/or frequency of the transverse acting force is adjusted through the current.

In the preferred embodiment of the measurement apparatus for the micro- and nano-scale material, a series circuit of the sample and the conductive flat punch is also connected in series with a current source meter 6 and a current controller 7.

Figure 3:
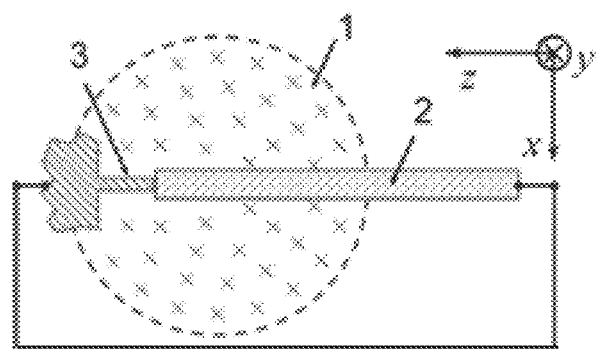
FIG. 3 is a structural schematic diagram of a measurement apparatus for a micro- and nano-scale material according to one embodiment of the present invention.

FIG. 3 is a schematic diagram of a measurement apparatus for a micro- and nano-scale material according to one embodiment of the present invention. In one embodiment, the measurement apparatus for the micro- and nano-scale material includes:

a magnetic field generation unit, used for generating a magnetic field 1;

a conductive flat punch 2, arranged on the magnetic field 1; and a sample 3, arranged on the magnetic field 1, the sample 3 comprising the micro- and nano-scale material.

When the current passes through the sample 3 and the conductive flat punch 2, the current direction is perpendicular to that of the magnetic field, and the conductive flat punch 2 generates a predetermined transverse acting force under the electromagnetic field to move laterally relative to the sample.

Figure 4:
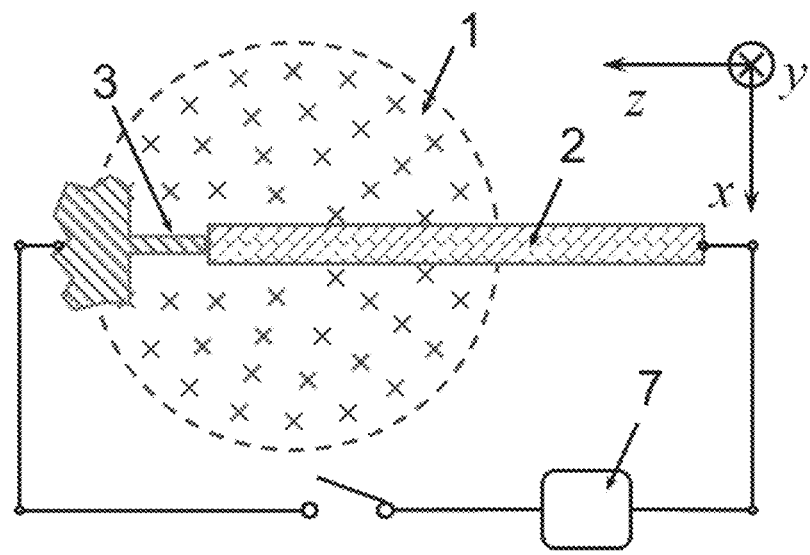
FIG. 4 is a structural schematic diagram of a measurement apparatus for a micro- and nano-scale material according to one embodiment of the present invention.

FIG. 4 is a schematic diagram of a measurement apparatus for a micro- and nano-scale material according to one embodiment of the present invention. In one embodiment, a series circuit of the sample 3 and the conductive flat punch 2 is also connected in series with a switch and a current controller 7.

In the preferred embodiment of the measurement apparatus for the micro- and nano-scale material of the present invention, the measurement apparatus further includes a mechanical controller which applies a predetermined load to the sample through the conductive flat punch 2.

In the preferred embodiment of the measurement apparatus for the micro- and nano-scale material of the present invention, the measurement apparatus includes an electromechanical coupling holder arranged in the magnetic field, and the conductive flat punch 2 is arranged on the electromechanical coupling holder.

Figure 5:
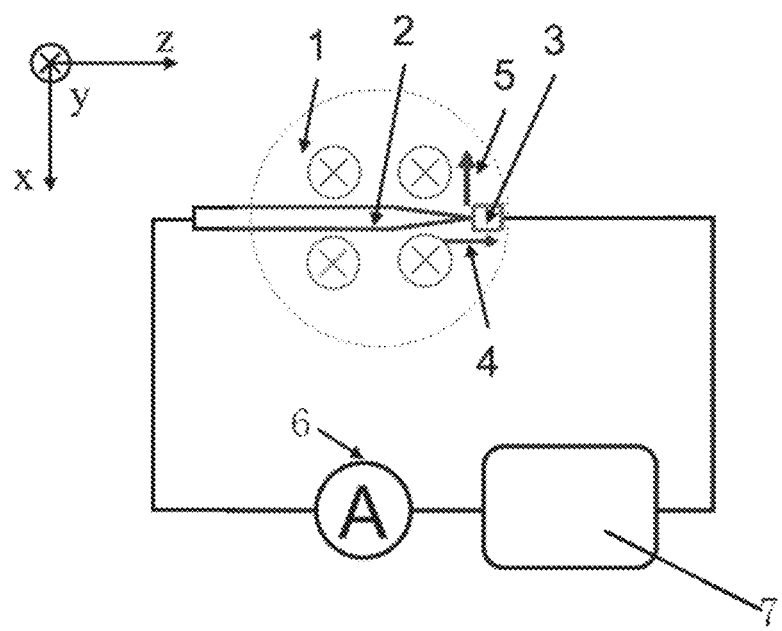
FIG. 5 is a structural schematic diagram of a measurement apparatus for a micro- and nano-scale material according to one embodiment of the present invention.

FIG. 5 is a schematic diagram of a measurement apparatus for a micro- and nano-scale material according to one embodiment of the present invention. In one embodiment, a series circuit of the sample 3 and the conductive flat punch 2 is also connected in series with a current source meter 6 and a current controller 7.

In the preferred embodiment of the measurement apparatus for the micro- and nano-scale material of the present invention, the electromechanical coupling holder is arranged in the magnetic field along the y-axis direction of the transmission electron microscope. In testing, the micro- and nano-scale sample 3 is connected in series with the conductive flat punch 2 in the electromechanical coupling holder and the current source meter 6, and after a current along a z-axis direction is applied, an electromagnetic field is generated and enables the conductive flat punch 2 to be subjected to an ampere force along an x-axis direction. In addition, the current source meter 6 is electrically connected with the current controller 7.

For further understandings of the present invention, the following examples are particularly exemplified.

Figure 6:
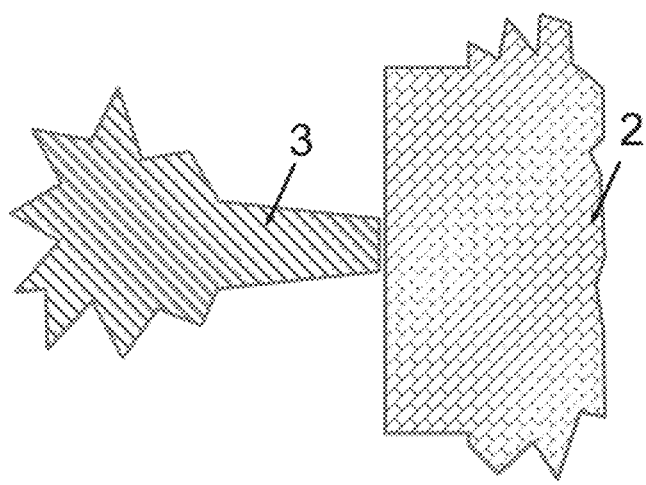
FIG. 6 is a schematic diagram of contact between a sample and a conductive flat punch of a measurement apparatus for a micro- and nano-scale material according to one embodiment of the present invention.
Figure 7:
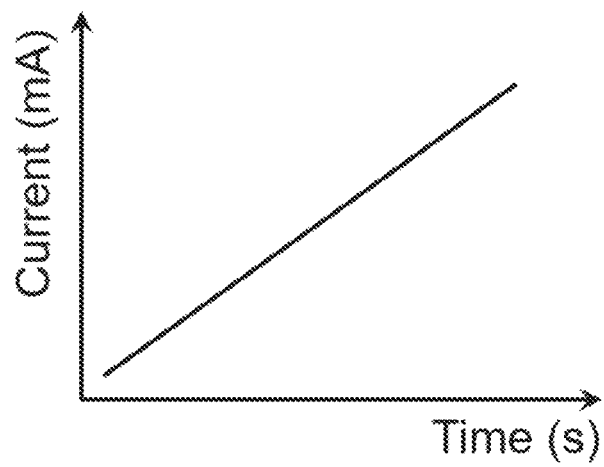
FIG. 7 is a schematic diagram of the linear current of a measurement apparatus for a micro- and nano-scale material according to one embodiment of the present invention.
Figure 8:
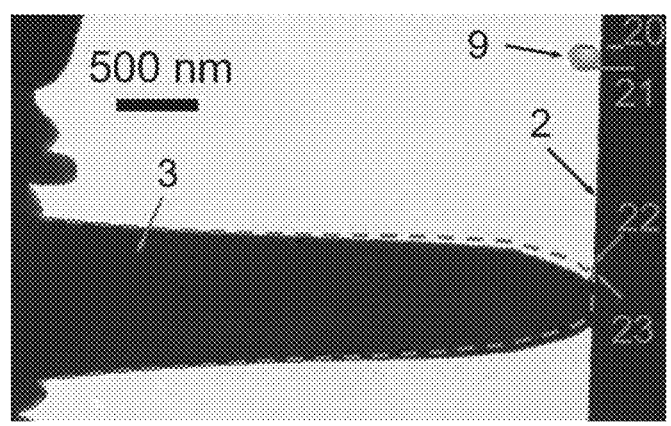
FIG. 8 is an image of the deflection of the silver pillar under a transmission electron microscope of a measurement apparatus for a micro- and nano-scale material according to one embodiment of the present invention.
Figure 9:
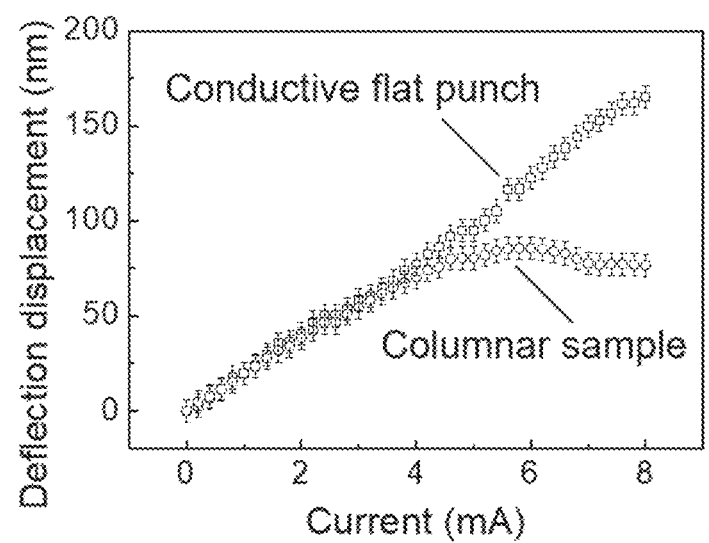
FIG. 9 is a schematic diagram that a deflection displacement varies with the current in a measurement apparatus for a micro- and nano-scale material according to one embodiment of the present invention.
Figure 10:
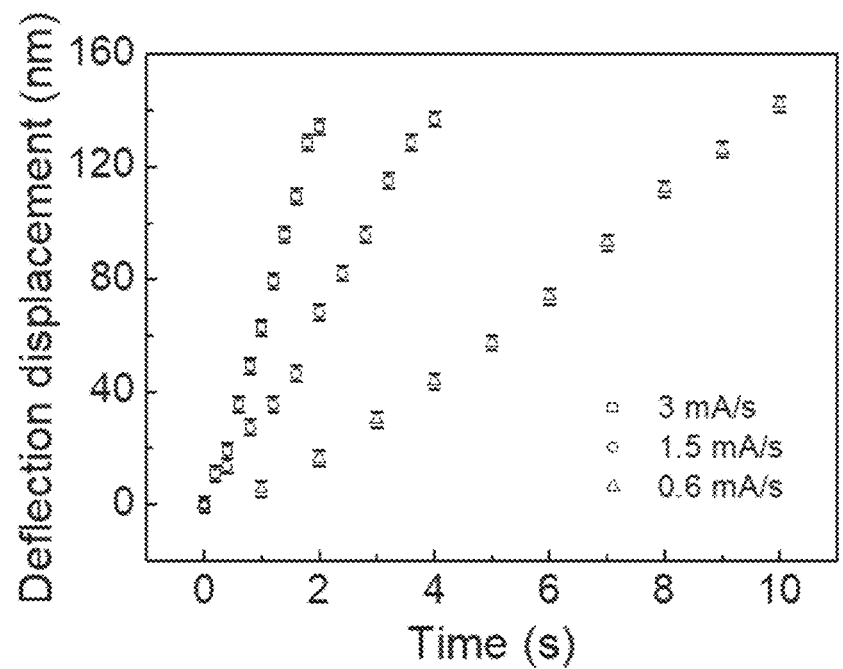
FIG. 10 is a schematic diagram of a deflection rate of a flat punch under various current rates of a measurement apparatus for a micro- and nano-scale material according to one embodiment of the present invention.

Embodiment 1 Measure the Friction Performance of a Micro- and Nano-Scale Material Referring to FIG. 6, the micro- and nano-scale columnar sample 3 is processed using a focused ion beam. The conductive flat punch 2 is in contact with the columnar sample 3 to form reliable electric contact, and a linear current as shown in FIG. 7 is applied. As shown in FIG. 8, by the real-time image recording system equipped on the transmission electron microscope, it is observed that the conductive flat punch 2 may move transversely under the ampere force. Referring to a marker 19 at the top surface of the conductive flat punch 2, under the linear current, the conductive flat punch 2 moves from position 20 (marked by dashed line) to 21 (marked by solid line), and the columnar sample 3 also moves from position 22 (marked by dashed-line profile) to a final position 23. From the real-time video, a relationship that maximum deflection displacements of the conductive flat punch 2 and the columnar sample 3 vary with the current may be obtained through image processing, as shown in FIG. 9. When the current is increased from 0 mA to 4 mA, the conductive flat punch 2 and the columnar sample 3 have the same deflection displacements, so that no relative movement exists between their contact surfaces, which shows static friction. When the current is continuously increased, the deflection displacement of the conductive flat punch 2 starts to be greater than that of the columnar sample 3, and the contact surfaces start to slide relatively. As mentioned above, the ampere force is controlled by the current, and the deflection displacement of the conductive flat punch is mainly determined by the ampere force, so that the deflection rate of the flat punch may be controlled by controlling the increasing rate of the current, as shown in FIG. 10, so as to change the sliding rate. Therefore, the static friction performance and the kinetic friction performance of the micro- and nano-scale sample may be measured by using the present invention. In addition, the sliding rate can be adjusted, and the influence of the sliding rate on the friction performance could be investigated.

Figure 11:
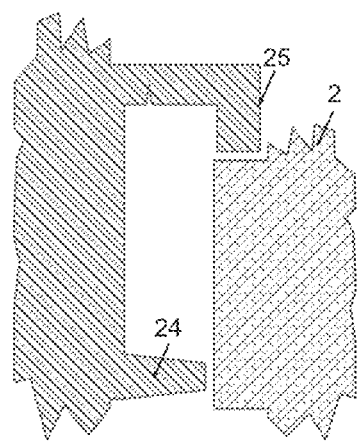
FIG. 11 is a schematic diagram of contact between a sample and a conductive flat punch of a measurement apparatus for a micro- and nano-scale material according to one embodiment of the present invention.
Figure 12:
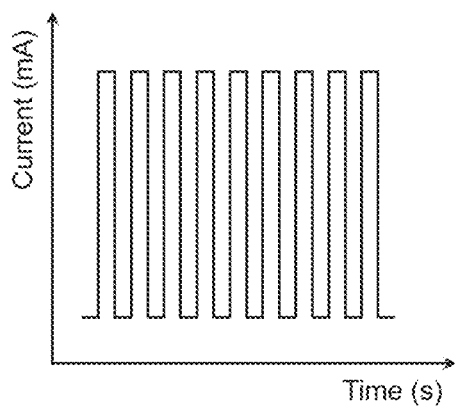
FIG. 12 is a schematic diagram of the pulsed current of a measurement apparatus for a micro- and nano-scale material according to one embodiment of the present invention.
Figure 13:
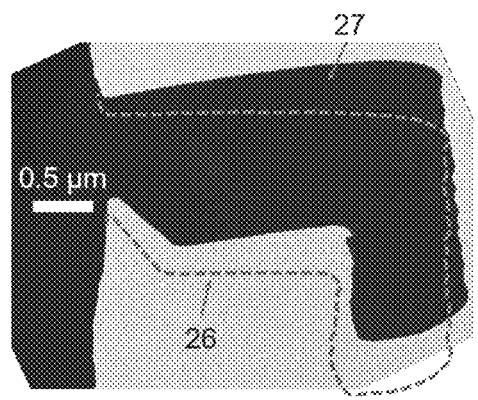
FIG. 13 is an image under a transmission electron microscope of a measurement apparatus for a micro- and nano-scale material according to one embodiment of the present invention.

Embodiment 2 Test the Failure Behavior of a Cantilever Structure of the Micro- and Nano-Scale Material Referring to FIG. 11, a micro- and nano-scale current-flowing needle 24 and a cantilever 25 are processed using a focused ion beam. The conductive flat punch 2 is in contact with the current-flowing needle 24 to form reliable electric contact, and the side edge of the conductive flat punch 2 is away from the cantilever 25 at a certain distance. By applying the periodic electric pulse as shown in FIG. 12, the conductive flat punch 2 moves along the −x direction under the action of the ampere force, and is in contact with the cantilever 25 to strain the cantilever 25. FIG. 13 shows a plastic deformation failure occurring in the silver cantilever under the action of cyclic straining, indicating that the cantilever plastically deforms from the initial position 26 to the final position 27. The displacement amplitude of the conductive flat punch may be adjusted according to the magnitude of the electric pulse, and a moving frequency of the conductive flat punch is controlled by the frequency of the electric pulse. Therefore, through the structural design, the present invention may be used for exploring the mechanical fatigue performance of the micro- and nano-scale material.

Figure 14:
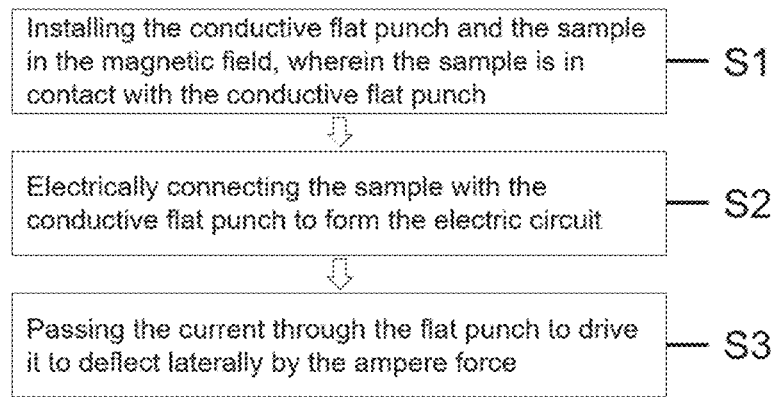
FIG. 14 is a schematic diagram of steps of a measurement method using a measurement apparatus for a micro- and nano-scale material according to one embodiment of the present invention.

FIG. 14 is a schematic diagram of steps of a measurement method using a measurement apparatus for a micro- and nano-scale material according to one embodiment of the present invention. As shown in the figure, the measurement method using the measurement apparatus for the micro- and nano-scale material includes:

first step S1, a conductive flat punch and a sample are installed in a magnetic field, wherein the sample is in contact with the conductive flat punch;

second step S2, the sample is electrically connected with the conductive flat punch to form an electric circuit; and third step S3, a current is applied to enable the conductive flat punch to move transversely under the ampere force.

In the preferred implementation mode of the measurement method of the present invention, in the first step S1, the sample processed using a focused ion beam is installed on an electromechanical coupling holder, and the electromechanical coupling holder is inserted into a transmission electron microscope which generates the magnetic field.

In the preferred implementation mode of the measurement method of the present invention, in the first step S1, when the sample is insulated, the sample is coated with a conductive layer.

In the preferred implementation mode of the measurement method of the present invention, in the third step S3, a mechanical controller applies a load to the conductive flat punch to control a contact force between the conductive flat punch and the sample. The load lasts 60 s at each time, and the value of the load is between 50 μN and 200 μN.

In the preferred implementation mode of the measurement method of the present invention, in the third step S3, a current controller outputs a linear current which is increased at first and then decreased.

In the preferred implementation mode of the measurement method of the present invention, the sample is a micro- and nano-scale sample. When a frictional property of the sample is tested, a sine-wave current is selected. When the plastic deformation of the sample is tested, an electric pulse is selected.

In the preferred implementation mode of the measurement method of the present invention, the sample is of a cantilever structure, and the side surface of the conductive flat punch is in contact with the sample.

In the preferred implementation mode of the measurement method of the present invention, an ampere force-based measurement method for the in situ mechanical property of a micro- and nano-scale material includes:

first step, a micro- and nano-scale sample processed using a focused ion beam is installed on an electromechanical coupling holder which is inserted into a transmission electron microscope;

second step, a current source meter, the micro- and nano-scale sample and a conductive flat punch 2 are electrically connected through conductive wires to form an electric circuit;

third step, real-time observation is performed under an imaging mode of the transmission electron microscope, and the position of the conductive flat punch 2 is adjusted through a mechanical control system on the electromechanical coupling holder so as to enable the conductive flat punch 2 to be in contact with the micro- and nano-scale sample;

fourth step, an electric signal of the circuit where the flat punch 2 and the micro- and nano-scale sample are located is measured to ensure a good electric contact;

fifth step, a linear current which is increased at first and then decreased is applied through a current controller with 10 s, wherein the peak value of the linear current is between 4 mA and 18 mA, which increases at the interval of 2 mA; and sixth step, at the beginning of the test, a mechanical controller applies a load to the conductive flat punch 2 to control a contact force between the conductive flat punch 2 and the micro- and nano-scale sample, wherein the load kept for 60 s at each time, and the value of the load is between 50 µN and 200 µN.

In the transmission electron microscope, a high-intensity magnetic field of about 2 T exists in the vicinity of the pole piece, generated by the electromagnetic lens. Thus, once the current flows through the flat punch, an ampere force may be generated and may enable the conductive flat punch 2 to move.

Figure 15:
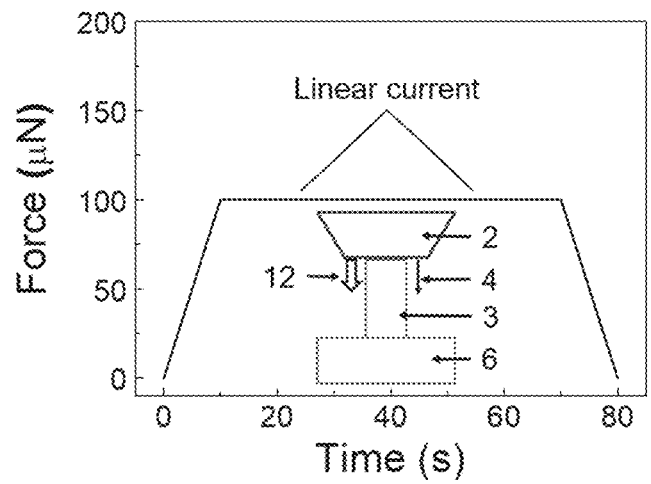
FIG. 15 is a schematic diagram of electromechanical coupling at constant load of a measurement method using a measurement apparatus for a micro- and nano-scale material according to one embodiment of the present invention.

As shown in FIG. 15, the mechanical controller makes sure the contact force between the conductive flat punch 2 and the sample 3 to be 50 µN for 60 s. Furthermore, the linear current is applied, the peak value of which is 4 mA for 10 s. At the moment, one electromechanical coupling cycle is completed.

Figure 16:
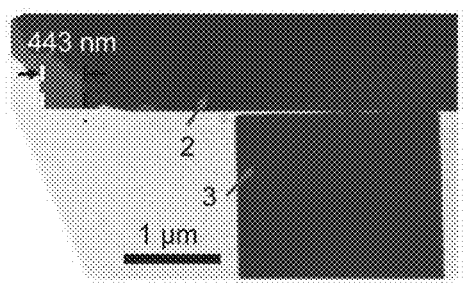
FIG. 16 is a schematic diagram of relative sliding of a measurement method using a measurement apparatus for a micro- and nano-scale material according to one embodiment of the present invention, wherein the load is 50 μN; in case that the peak value of the linear current is 18 mA, a tungsten flat punch relatively slides along a silver pillar; a white dotted line and a black dotted line respectively represent positions before and after the sliding of the flat punch; and a sliding displacement is 443 nm.

As the conductive flat punch 2 is subjected to the ampere force perpendicular to a magnetic field direction 1 and a current direction 4, and when the ampere force is greater than a static friction force from the micro- and nano-scale sample 3, the conductive flat punch 2 would slide relative to the micro- and nano-scale sample 3, as shown in FIG. 16. At a constant load of 50 µN, when the peak value of the linear current is 18 mA, the flat punch slides 443 nm.

In addition, as the ampere force is proportional to the magnitude of the current, the ampere force could be adjusted by the current. In the mechanical test of the micro- and nano-scale sample, the sliding friction force is proportional to the contact force between the conductive flat punch 2 and the sample, so that the friction force may be adjusted by controlling the contact force.

Figure 17:
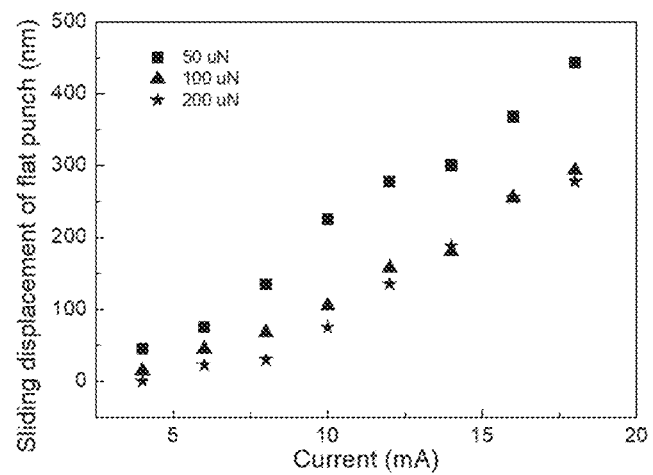
FIG. 17 is a schematic diagram of a relation between the maximum sliding displacement of a flat punch and the increasing current under constant loading with various values in a measurement method using a measurement apparatus for a micro- and nano-scale material according to one embodiment of the present invention.

Sliding displacements of the conductive flat punch 2 under different loads and different current conditions are tested, respectively, thus obtaining curves between the sliding displacement of the conductive flat punch 2 and the current under different loads, as shown in FIG. 17. It can be known from FIG. 17 that with the increasing current, the displacement approximately linearly increases, and with the decreasing load, the displacement increases. In addition, when the peak value of the current is between 4 mA and 18 mA, the conductive flat punch 2 generates a relative sliding displacement from 0 nm to 440 nm. Furthermore, theoretically, there is no upper limit to the value of the displacement.

As the direction of the ampere force is determined by the current direction, the direction of the ampere force may be controlled through the current direction. When the sine-wave current is applied, it can be observed that the flat punch reciprocates along the x axis.

The frequency of the ampere force is also directly determined by the frequency of the current. When a sine-wave current of different periods is applied, it can be observed that the frequency of the sliding displacement of the flat punch is completely consistent with the frequency of the sine-wave current.

In the transmission electron microscope, the magnitude of the ampere force also could be altered by changing the strength of the magnetic field.

The present invention is further described through the following embodiments: according to the following embodiments, the present invention may be better understood. However, those skilled in the art easily understand that specific material ratios, process conditions and results that are described in the embodiments are merely used to describe the present invention, and should and may not restrict the present invention described in detail in claims.

Embodiment 3

Figure 18:
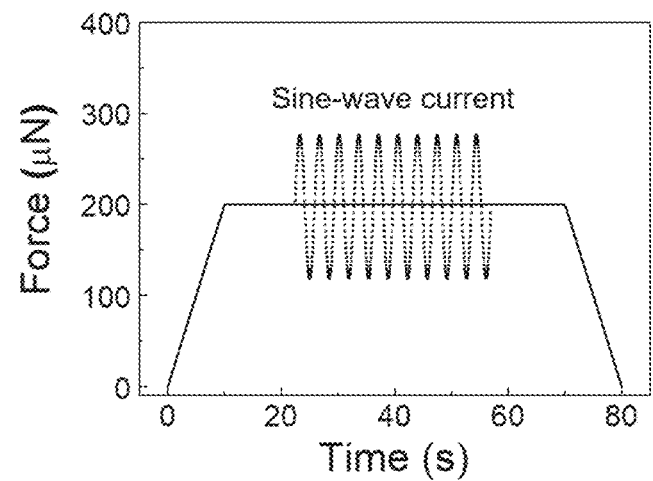
FIG. 18 is a schematic diagram of electromechanical coupling of a sine-wave current at constant loading in a measurement method using a measurement apparatus for a micro- and nano-scale material according to one embodiment of the present invention.

An ampere force-based measurement method for the friction force of a micro- and nano-scale material includes first step, a polycrystalline silver square pillar having an edge length of 3 µm is processed using a focused ion beam, and the pillar shall be as short and thick as possible to guarantee relatively high stiffness and avoid bending along with the swinging of the flat punch;

second step, in the transmission electron microscope JEOL 2100F, the electromechanical coupling holder PI 95 ECR of the Hysitron Company is used to complete an electromechanical coupling experiment, the position of a tungsten flat punch is adjusted to contact with the top of the polycrystalline silver pillar, and an electrical test is performed to guarantee a good electric contact; and third step, the mechanical controller is used to set a loading curve, and the load is maintained at 200 µN for 60 s; during the constant load, a sine-wave current as shown in FIG. 18 is imposed, the peak value of which is 30 mA; and the periods of the sine-wave current are altered to be 0.7 s, 1.4 s, 2.1 s, 2.8 s, 3.5 s and 4.2 s, respectively.

In the test process, it is observed that the flat punch slides relative to the silver pillar. The sliding displacement is linearly dependent on the current, and the frequency of the sliding displacement is completely consistent with the frequency of the sine-wave current.

Figure 19:
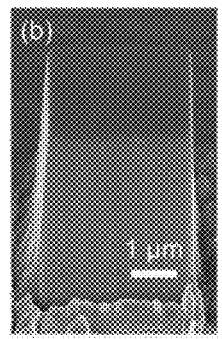
FIG. 19 is an image of the silver pillar before the scratching under a scanning electron microscope in a measurement method using a measurement apparatus for a micro- and nano-scale material according to one embodiment of the present invention.
Figure 20:
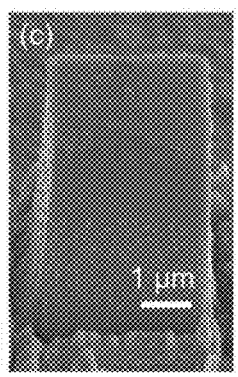
FIG. 20 is an image of the silver pillar after the scratching under a scanning electron microscope in a measurement method using a measurement apparatus for a micro- and nano-scale material according to one embodiment of the present invention.

After the test, a scanning electron microscope is used for characterization. The morphology of the silver pillar subjected to scratching is as shown in FIG. 20. Furthermore, the obvious scratch is observed on the top surface in comparison with the silver pillar before scratching as shown in FIG. 19.

The present embodiment indicates that the present invention may be used for in situ friction test on the micro- and nano-scale material, and the friction frequency is completely controlled by the frequency of the current.

Embodiment 4

Figure 21:
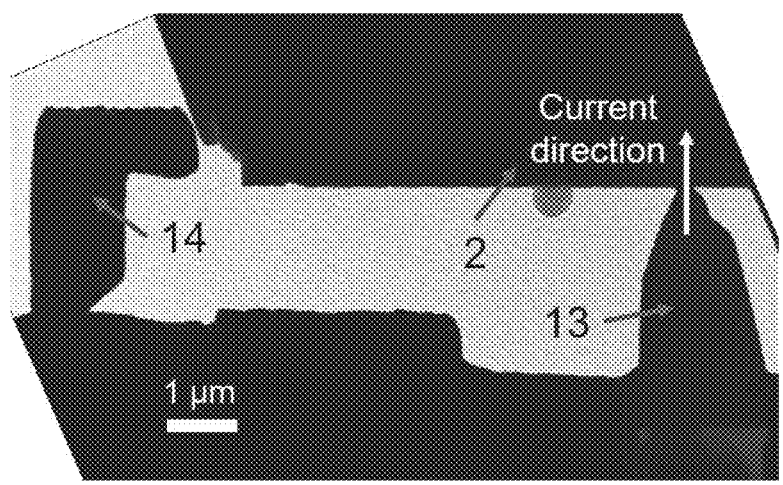
FIG. 21 is a structural schematic diagram of a plastic deformation test apparatus of a measurement method using a measurement apparatus for a micro- and nano-scale material according to one embodiment of the present invention.
Figure 22:
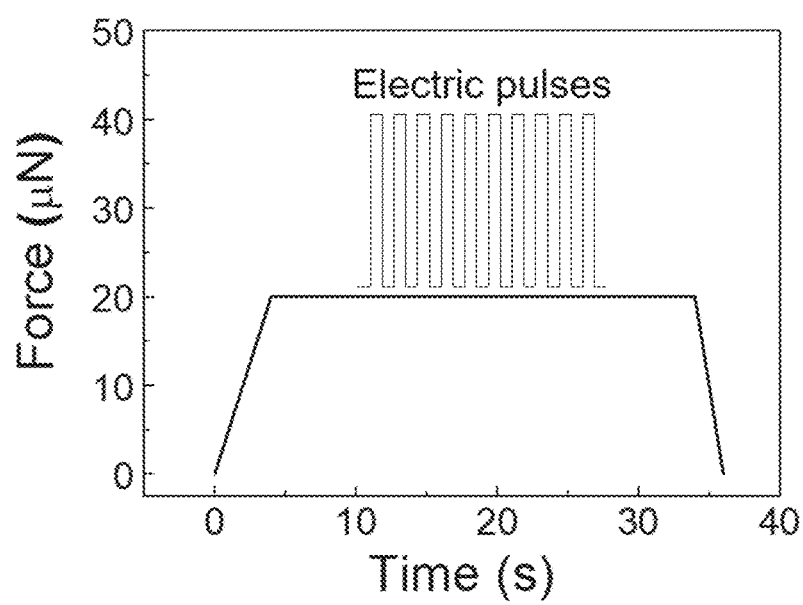
FIG. 22 is a schematic diagram of electromechanical coupling of the electric pulse at the constant loading in a measurement method using a measurement apparatus for a micro- and nano-scale material according to one embodiment of the present invention.

Apply a cyclic load to a cantilever structure through an electric pulse includes:

first step, the cantilever 14 parallel to the current direction 4 is processed on a polycrystalline silver film by a focused ion beam, as shown in FIG. 21; a needle-like structure 13 for current flowing is processed at a position, 6 µm away from the notch side of the cantilever, and is designed as a needle-like structure having a thin top and a thick base in order to ensure that the flat punch slides along the needle-like structure;

second step, the flat punch is adjusted to contact with the needle-like structure at the top and contact with cantilever at the side as shown in FIG. 21; and third step, specific parameters of electromechanical coupling are as shown in FIG. 22; a mechanical controller applies a constant load of 20 µN for 60 s; and during the constant load, an electric pulse is imposed, which has a peak value of 10 mA, a period of 1 s and a duty ratio of 0.5.

Figure 23:
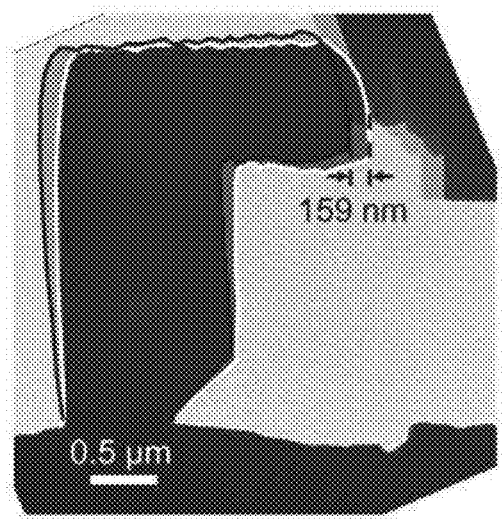
FIG. 23 is an image of a silver cantilever before and after the deformation under a transmission electron microscope of a measurement method using a measurement apparatus for a micro- and nano-scale material according to one embodiment of the present invention.
Figure 24:
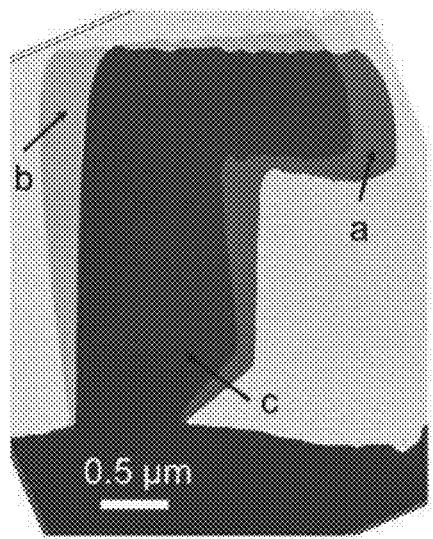
FIG. 24 is an image of a silver cantilever after plastic deformation under a transmission electron microscope of a measurement method using a measurement apparatus for a micro- and nano-scale material according to one embodiment of the present invention, wherein a is a region before the deformation of the cantilever, b is a region after the deformation of the cantilever, and c represents an overlapped region before and after the deformation of the cantilever.

In the experiment, it can be observed that when the electric pulse is imposed, the flat punch slides laterally to deform the cantilever. As shown in FIG. 23, the white-line profile is a contour of the initial position of the cantilever, and the black-line profile is a contour of the deformed cantilever. The flexibility of the cantilever along the x axis may be up to 159 nm. After the cyclic load is applied for multiple times, the cantilever finally experiences a plastic deformation. In FIG. 24, pictures of an initial state and a final state of the cantilever are incorporated into one picture with different transparencies, and it can be observed that the cantilever experiences obvious plastic deformation. The present embodiment indicates that the present invention may be used for applying the cyclic load to the cantilever structure.

INDUSTRIAL PRACTICABILITY

The measurement apparatus for the micro- and nano-scale material and the measurement method of the present invention may be manufactured and used in the field of micro- and nano-scale measurement.

The basic theory of the present application is described above in combination with the specific embodiments. However, it should be noted that the advantages, benefits and effects that are mentioned in the present application are merely exemplary but not restrictive, and shall not be deemed as necessary for all the embodiments of the present application. In addition, the above-mentioned disclosed specific details are merely used as examples and to facilitate the understandings, but are not restrictive. The above-mentioned details do not limit that the present application must be implemented by the above-mentioned specific details.

Block diagrams of devices, apparatuses, equipment and systems in the present application are merely used as exemplary examples, and are not intended to require or imply that these devices, apparatuses, equipment and systems must be connected, arranged and configured according to modes as shown in the block diagrams. Those skilled in the art will realize that these devices, apparatuses, equipment and systems may be connected, arrayed and configured in any way. For example, words such as "including", "comprising" and "having" are open phrases meaning "including but not limited to", and may be used interchangeably. Unless otherwise defined in the context, words "or" and "and" used herein mean a phrase "and/or", and may be used interchangeably. The word "for example" used herein means a phrase "for example but not limited to", and may be used interchangeably.

It should be further noted that in the apparatus, equipment and method of the present application, each component or each step may be exploded and/or recombined. The exploding and/or recombination shall be deemed as equivalent solutions of the present application.

The above descriptions of the disclosed aspects are provided to enable any one skilled in the art to make or use the present application. Various modifications to these aspects are particularly obvious to those skilled in the art, and general theories defined herein may be applied to other aspects without departing from the scope of the present application. Therefore, the present application is not intended to be limited to the aspects described herein, but shall fall within the widest scope consistent with the theories and novel features that are disclosed herein.

For exemplification and description, the above descriptions that are not intended to limit the embodiments of the present application to the forms disclosed herein have been provided. Multiple exemplary aspects and embodiments have been discussed above, but those skilled in the art still will realize some deformations, modifications, changes, additions and sub combinations of the aspects and the embodiments.

The invention claimed is:

1. A measurement apparatus for a micro- and nano-scale material, comprising:
   a transmission electron microscope, used for generating a magnetic field in a first direction;
   a conductive flat punch, arranged on the magnetic field;
   a sample, arranged on the magnetic field, the sample comprising a micro- and nano-scale material, wherein the sample is electrically connected with the conductive flat punch to form an electric circuit, wherein the conductive flat punch has a first length at millimeter scale, and the sample has a second length and the second length of the sample is at micron-meter scale;
   a mechanical controller providing a load to the conductive flat punch to control a contact force between the conductive flat punch and the sample, wherein the load lasts 60 seconds at each time, and a value of the load is between 50 µN and 200 µN; and
   a current controller outputting a current which is increased at first and then decreased, wherein when a frictional property of the sample is tested, the current with a sine-wave is selected; and when a plastic deformation of the sample is tested, the current with an electric pulse is selected,
   wherein when the current passes through the sample and the conductive flat punch in a second direction, perpendicular to the first direction of the magnetic field;
   wherein the current has a peak value that is between 4 mA and 18 mA, and the current is increased at the interval of 2 mA, and the conductive flat punch deflects in a third direction perpendicular to the first and the second directions laterally in an amount from 0 nm to 440 nm relative to the sample with controllable displacement driven by an electromagnetic force that is in proportion to an intensity of the magnetic field and the current, thereby achieving measurements of static friction performance and kinetic friction performance of the sample; and
   wherein the conductive flat punch, the sample, the current controller and a current source meter are connected to each other in sequence.

2. The measurement apparatus for the micro- and nano-scale material of claim 1, wherein, the conductive flat punch is of a cantilever structure, and a free end of the cantilever structure is in contact with the sample.

3. The measurement apparatus for the micro- and nano-scale material of claim 1, wherein, the sample and the conductive flat punch is also connected in series with the current source meter and the current controller.

4. The measurement apparatus for the micro- and nano-scale material of claim 1, wherein, magnitude and/or frequency of the electromagnetic force is adjusted through current.

5. The measurement method using the measurement apparatus for the micro- and nano-scale material of claim 1, comprising
   first step (S1), installing the conductive flat punch and the sample in the magnetic field, wherein the sample is in contact with the conductive flat punch;

second step (S2), electrically connecting the sample with the conductive flat punch to form the electric circuit; and third step (S3), passing the current to enable the conductive flat punch to move transversely under an action of an ampere force.

6. The measurement method of claim 5, wherein, in the first step (S1), the sample processed using a focused ion beam is installed on an electromechanical coupling holder, and the electromechanical coupling holder is inserted into a transmission electron microscope which generates the magnetic field.

7. The measurement method of claim 5, wherein, in the first step (S1), when the sample is insulated, the sample is coated with a conductive layer.

8. The measurement method using the measurement apparatus for the micro- and nano-scale material of claim 2, comprising:

first step (S1), installing the conductive flat punch and the sample in the magnetic field, wherein the sample is in contact with the conductive flat punch;

second step (S2), electrically connecting the sample with the conductive flat punch to form the electric circuit; and third step (S3), passing the current to enable the conductive flat punch to move transversely under an action of an ampere force.

9. The measurement method using the measurement apparatus for the micro- and nano-scale material of claim 3, comprising:

first step (S1), installing the conductive flat punch and the sample in the magnetic field, wherein the sample is in contact with the conductive flat punch;

second step (S2), electrically connecting the sample with the conductive flat punch to form the electric circuit; and third step (S3), passing the current to enable the conductive flat punch to move transversely under an action of an ampere force.

10. The measurement method using the measurement apparatus for the micro- and nano-scale material of claim 4, comprising:

first step (S1), installing the conductive flat punch and the sample in the magnetic field, wherein the sample is in contact with the conductive flat punch;

second step (S2), electrically connecting the sample with the conductive flat punch to form the electric circuit; and third step (S3), passing the current to enable the conductive flat punch to move transversely under an action of an ampere force.

* * * * *